(12) United States Patent
Gammenthaler

(10) Patent No.: US 8,610,881 B2
(45) Date of Patent: *Dec. 17, 2013

(54) LIDAR MEASUREMENT DEVICE WITH TARGET TRACKING AND METHOD FOR USE OF SAME

(75) Inventor: Robert S. Gammenthaler, Plano, TX (US)

(73) Assignee: Applied Concepts, Inc., Plano, TX (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/406,267

(22) Filed: Feb. 27, 2012

(65) Prior Publication Data

US 2012/0154788 A1 Jun. 21, 2012

Related U.S. Application Data

(63) Continuation of application No. 12/510,915, filed on Jul. 28, 2009, now Pat. No. 8,125,622.

(51) Int. Cl.
*G01P 3/36* (2006.01)
(52) U.S. Cl.
USPC ............................................ 356/28; 356/28.5
(58) Field of Classification Search
USPC ............. 356/3.01–3.15, 4.01–4.1, 5.01–5.15, 356/6–2, 28, 28.5
See application file for complete search history.

(56) References Cited

U.S. PATENT DOCUMENTS

| | | | |
|---|---|---|---|
| 5,221,956 A | 6/1993 | Patterson et al. | |
| 6,441,889 B1 | 8/2002 | Patterson | |
| 6,556,282 B2 | 4/2003 | Jamieson et al. | |
| 7,961,301 B2 | 6/2011 | Earhart et al. | |
| 8,125,622 B2 | 2/2012 | Gammenthaler | |
| 2004/0083035 A1 | 4/2004 | Ellis | |
| 2007/0291127 A1 | 12/2007 | Prieto et al. | |
| 2008/0111731 A1 | 5/2008 | Hubbard et al. | |
| 2010/0277714 A1 | 11/2010 | Pedersen et al. | |
| 2010/0292886 A1* | 11/2010 | Szczerba et al. ................ | 701/29 |
| 2011/0026007 A1 | 2/2011 | Gammenthaler | |

OTHER PUBLICATIONS

Shirbacheh, Mike, Microscopy, Electrochemistry, and Conductivity Analyzer (MECA) Payload on mars o7 Phoenix Lander, IEEEAC Paper #1496, Version 2, Jan. 20, 2004.

* cited by examiner

*Primary Examiner* — Luke Ratcliffe
(74) *Attorney, Agent, or Firm* — Scott T. Griggs; Griggs Bergen LLP

(57) ABSTRACT

A Lidar measurement device for vehicular traffic surveillance and method for use of same are disclosed. In one embodiment, video circuitry acquires video of a field of view having a target therein. A steerable laser progressively scans the field of view to identify targets. The steerable laser then progressively, repeatedly scans a sub-field of the field of view containing the target. A processing circuit portion determines target data of the target based upon range and time measurements associated with reflected laser range-finding signals from the scans of the sub-field. The processing circuit then integrates the target data into the video such that the video may displayed with an image of the target and target data, such as a speed measurement, associated therewith.

20 Claims, 12 Drawing Sheets

LIDAR MEASUREMENT DEVICE WITH TARGET TRACKING AND METHOD FOR USE OF SAME

PRIORITY STATEMENT & CROSS-REFERENCE TO RELATED APPLICATIONS

This application is a continuation of co-pending U.S. patent application Ser. No. 12/510,915 entitled "Lidar Measurement Device with Target Tracking and Method for Use of Same" and filed on Jul. 28, 2009, in the name of Robert S. Gammenthaler, which issues on Feb. 28, 2012 as U.S. Pat. No. 8,125,622. This application discloses subject matter related to the subject matter disclosed in the following commonly owned, co-pending patent application: "Lidar Measurement Device for Vehicular Traffic Surveillance and Method for Use of Same," filed on Jul. 28, 2009, application Ser. No. 12/510,876, in the name of Robert S. Gammenthaler; which is hereby incorporated by reference for all purposes.

TECHNICAL FIELD OF THE INVENTION

This invention relates, in general, to police speed detection systems and, in particular, to a light detection and ranging (Lidar) measurement device for vehicular traffic surveillance in environments having multiple target vehicles and a method for use of the same.

BACKGROUND OF THE INVENTION

The role of speed detection in traffic safety enforcement is widespread throughout the United States and the principal tool for police traffic surveillance is Doppler radar. In a police Doppler radar system, an emitted microwave frequency signal is reflected from a target vehicle, causing a change in the frequency of the signal in proportion to a component of the velocity of the target vehicle. The Doppler radar system measures the frequency differential and scales the measurement to miles per hour, for example, in order to display the velocity of the target vehicle to a policeman or other Doppler radar system operator. Using the existing frequency differential scheme, conventional police Doppler radar systems are capable of a high degree of accuracy with regard to vehicle speed measurements in environments having one target vehicle.

Limitations, however, have led to restricting its effectiveness and use in highway-safety programs. Traditional radar devices are not target selective since a beam width of approximately 15° is emitted. As a result, positive operator target identification is perceived as challenging.

Alternative technologies, including Lidar, have been developed and deployed to overcome these limitations. Lidar speed-measuring devices do not operate on Doppler radar principles. Rather, Lidar speed-measuring devices use laser pulses and time-distance principles to measure vehicle speed. The narrow beamwidth, laser pulses of Lidar enable the operator to select individual vehicles and positively identify the target vehicle. But, while Lidar overcomes certain specific limitations associated with radar speed-measurement devices, it introduces challenges of its own. Existing Lidar speed-measuring devices are designed to be aimed and operated from a shoulder, with the butt end of the stock of the device firmly set against the shoulder, or a fixed tripod mount. Both methods make use more cumbersome than that of Doppler radar speed-measuring devices.

SUMMARY OF THE INVENTION

A Lidar measurement device and method for use of the same are disclosed for vehicular traffic surveillance in environments having one or multiple target vehicles. In one embodiment, video circuitry acquires video of a field of view having a target therein. A steerable laser progressively scans the field of view to identify targets. The steerable laser then progressively, repeatedly scans a sub-field of the field of view containing the target. A processing circuit portion determines target data of the target based upon range and time measurements associated with reflected laser range-finding signals from the scans of the sub-field. The processing circuit then integrates the target data into the video such that the video may displayed with an image of the target and speed measurement associated therewith.

The teachings presented herein address the aforementioned limitations by providing precise aiming of the Lidar to track moving vehicles in a multiple vehicle environment without the need for existing awkward accessories or positions causing human fatigue. In particular, tripods are avoided and it is not necessary to maintain the butt end of the stock of the Lidar against the shoulder. Rather, by using a steerable laser, which may, for example, be mounted to a police vehicle, the laser beam may be scanned horizontally and vertically in a step-wise manner to paint a picture of the targets present within the field of view being captured by the video circuitry. The processing capabilities of the Lidar measurement device correlate the target data, such as range, direction of heading, and speed, to the video image for positive target identification by law enforcement or another user of the Lidar measurement device.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1A:
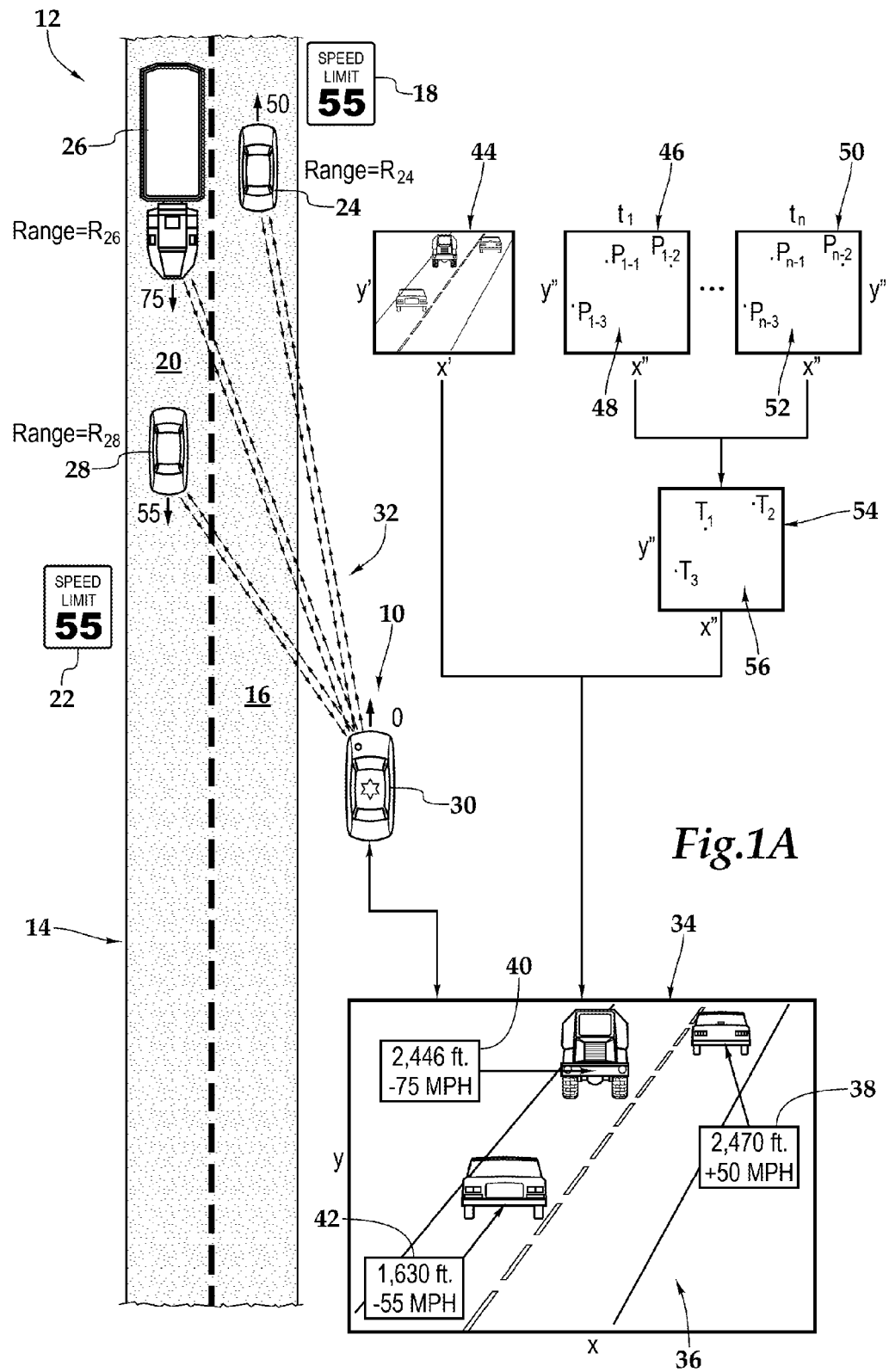
FIG. 1A depicts a schematic illustration of a multiple vehicle environment wherein one embodiment of a Lidar speed-measurement device with target tracking is being utilized to scan the multiple vehicle environment.

Referring initially to FIG. 1A, therein is depicted one embodiment of a Lidar measurement device, which is schematically illustrated and generally designated 10, being utilized in a multiple vehicle environment 12. A highway 14 includes a northbound lane 16 having a speed limit of 55 mph as depicted by speed limit sign 18 and a southbound lane 20 having a speed limit of 55 mph as depicted by speed limit sign 22. A vehicle 24 is traveling in the northbound lane 16 at a speed of 50 mph as indicated by the northbound arrow and number "50" proximate to the front portion of the vehicle 24. The range of the vehicle 24 is displayed as $R_{24}$. Vehicles 26 and 28 are traveling in the southbound lane 20 at speeds of 75 mph (Range=$R_{26}$) and 55 mph (Range=$R_{28}$), respectively. A patrol vehicle 30 equipped with the Lidar measurement device 10 is stationary and facing north in a location that is proximate to the northbound lane 14 in order to conduct vehicular traffic surveillance. The patrol vehicle 10 has a field of view 32 that includes the vehicles 24, 26, 28. Additionally, the vehicles 24, 26, 28, are positioned such that conditions are present that make the tracking of moving vehicles in a multiple vehicle environment difficult with existing Lidar measurement devices because of the need for awkward accessories or requirement for an operator position that induces human fatigue.

A display 34 is associated with the Lidar measurement device 10 and preferably secured to the dashboard in the interior of patrol vehicle 30. The Lidar measurement device 10 acquires an image 36 of the field of view 32 which includes vehicles 24, 26, and 28. The display 34 presents the image 36 of the field of view 32 to the operator with the vehicles 24, 26, 28 and associated target data such as speed, range, and heading relative to the Lidar measurement device 10. The target data is presented in target data boxes 38, 40, and 42. It should be appreciated, however, that other methods of graphical user interface are within the teachings presented herein. The display image 36, which includes both the video and associated target data, furnishes positive target identification by law enforcement or other user of the Lidar measurement device 10. For example, by viewing display 34, the operator can positively identify that the vehicle 24 is traveling at 50 mph away from the patrol vehicle 30 at a distance of 2,470 feet. Similarly, the vehicle 26 can be positively identified as traveling at 75 mph towards the patrol vehicle 30 at a distance of 2,446 feet and the vehicle 28 can be identified as traveling at 55 mph towards patrol vehicle at a distance of 1,630 feet. As shown, it should be appreciated that the display may be dedicated to displaying one or more aspects of the target data discussed above or configurable to provide other types of indications. For example, the display of the Lidar measurement device 10 may be programmed to provide a history of the speed of a particular targeted vehicle.

More particularly, as illustrated, an officer is operating the Lidar measurement device 10 for vehicular traffic surveillance. The Lidar measurement device 10 captures frame-by-frame video having an aspect ratio of x' to y' as represented by video frame 44. Substantially simultaneously, the Lidar measurement device 10 captures frame-by-frame laser having an aspect ratio of x" to y" as represented by laser frame 46. In one embodiment, the aspect ratios x' to y' for the video frame 44 and x" to y" for the laser frame 46 are substantially the same. In another embodiment, the aspect ratios of the video frame 44 and the laser frame 46 comprise identical aspect ratios.

Beginning at a time $t_1$, as part of the acquisition of the laser frame 46, the Lidar measurement device 10 progressively transmits short pulses of infrared light, which may be laser range-finding signals, directed in a narrow beam towards the field of view 32 having the target vehicles 24, 26, 28 therein. These signals are transmitted to the field of view in a horizontal and vertical step-wise manner. By way of example, the Lidar measurement device 10 may begin sending signals at the upper left hand corner of the field of view 32 and progress in a horizontal and vertical step-wise manner through the field of view 32 by sending a laser range-finding signal, pausing to receive a reflected laser range-finding signal, repositioning, and sending another laser range-finding signal.

When the light pulse strikes a target, such as the license plate of a vehicle, a portion of the light pulse is reflected in all directions and a small portion of this light pulse is reflected back towards the Lidar measurement device 10. This return energy is collected and focused on a sensitive detector that then converts the light pulse energy to an electrical pulse. As will be discussed in further detail hereinbelow, a high speed clock counts as the light pulse travels from the Lidar measurement device 10 to the target and back to determine total trip time. Using the known speed of light, an onboard processor determines the ranges as the time of flight is known.

With respect to the laser frame 46, the hits and misses may be recorded in a laser frame data array 48 which is represented as receiving reflected laser range-finding signals during the first scan at pixels $P_{1-1}$, $P_{1-2}$, and $P_{1-3}$. These reflected laser-range finding signals and pixels $P_{1-1}$, $P_{1-2}$, and $P_{1-3}$ correspond to target vehicles 26, 24, and 28, respectively. It should be appreciated that an indication that a reflected laser range-finding signal was not received may also be recorded in the laser frame data array 48. By way of example, the laser frame data array may store the following data as shown in Table I. It should be appreciated that although certain accuracies and precisions are indicated in the range and time, the teachings presented herein include instruments having different accuracies and precisions than those presented.

TABLE I

Exemplary Data Populating First Laser Frame Data Array

| Vehicle | Pixel | (x", y") | Δ (x", y") (pixels) | Range (feet) | Time (sec.) |
|---|---|---|---|---|---|
| 26 | $P_{1-1}$ | (45, 27) | 5 | 2,460.002 | 0.02 |
| 24 | $P_{1-2}$ | (109, 20) | 5 | 2,460.833 | 0.03 |
| 28 | $P_{1-3}$ | (9, 61) | 5 | 1,640.083 | 0.04 |

With respect to the reflected laser range-finding signal received for vehicle 26, the exemplary data presented in Table I indicates that a reflected laser range-finding signal was received for pixel $P_{11}$ having a pixel location of (45, 27) within the x", y" laser frame 46, which by way of example may have a field of view of 128 pixels wide by 96 pixels high. Additionally, the reflected laser-finding signal had a time of flight (not shown) indicating a range of 2,460.002 feet for the laser range-finding signal having a time stamp of 0.02 seconds. Based on this range and time of flight, the Δ pixel position is set at a 5 pixel radius for finding this same target in another laser frame. Table I includes similar data for vehicles 24, 28.

Following the first scan of the field of view 32, the Lidar measurement device 10, performs additional scans. At a time $t_n$, which may be the initialization of a second scan, a laser frame 50 is acquired and laser frame data array is built which reflects the receiving reflected laser range-finding signals at pixels $P_{2-1}$, $P_{2-2}$, and $P_{2-3}$. The laser frame data array 52 may include the information shown in the following table, Table II.

TABLE II

Exemplary Data Populating Second Laser Frame Data Array

| Vehicle | Pixel | (x", y") | Δ (x", y") (pixels) | Range (feet) | Time (sec.) |
|---|---|---|---|---|---|
| 26 | $P_{1-1}$ | (46, 26) | 5 | 2,432.502 | 0.27 |
| 24 | $P_{1-2}$ | (110, 19) | 5 | 2,479.166 | 0.28 |
| 28 | $P_{1-3}$ | (8, 62) | 5 | 1,619.917 | 0.29 |

Following the acquisition of the laser frames 46, 50 and laser frame data arrays 48, 52, the Lidar measurement device 10 performs a best fit analysis comparison on the laser frame data arrays 48, 52, which each may be considered target data buffers, to identify reflected laser range-finding signals belonging to particular targets. The Lidar measurement device 10 may execute the best fit analysis comparison utilizing the range measurement, a time measurement, and position in the field of view of the reflected laser range-finding signal.

In particular, the best fit analysis compares the pixel positions of the reflected laser range-finding signals and verifies that the range and time measurements are valid. By way of example, there is a pixel position of (46, 26) at time $t_1$ at 0.02 seconds and there is a pixel position of (45, 27) at time $t_n$ at 0.27 seconds. These pixel positions are within the Δ (x", y") of 5 pixels and 0.25 seconds apart. This analysis suggests a target. The presence of the target is then verified by noting that the range in feet closed from 2,60.002 feet 2,432.502 feet in 0.25 seconds. Accordingly, the target is added to the target list 54 as target $T_1$ with the appropriate target data 56 including the speed, following the calculation thereof. Similar analysis identifies targets $T_2$, which is the vehicle 24, and $T_3$, which is the vehicle 28. Exemplary target data 56 is presented in Table III.

TABLE III

Exemplary Target Data in Target List

| Target (Vehicle) | Pixel Data | f (x", y") | Speed (mph) | Range (feet) | Heading |
|---|---|---|---|---|---|
| $T_1$ (26) | $P_{1-1}, P_{n-1}$ | f (46, 26) | 75 | 2,466 | Closing |
| $T_2$ (24) | $P_{1-1}, P_{n-1}$ | f (110, 19) | 50 | 2,470 | Opening |
| $T_3$ (28) | $P_{1-1}, P_{n-1}$ | f (8, 62) | 55 | 1,630 | Closing |

As mentioned, the Lidar measurement device 10 determines the speed, range, and heading of a particular target based upon range and time measurements associated with the reflected laser range-finding signals. More specifically, target speed is calculated from the change in distance across an interval of time by the following velocity equation:

$$v=(\Delta R)/(\Delta t),\quad \text{Equation I, wherein}$$

$\Delta R=R_2-R_1$ for the range measurements in the first and second sets of data at times $t_2$ and $t_1$, respectively (Range may be expressed in feet and, in this example $t_2=t_n$)

$\Delta t=t_2-t_1$ for times $t_2$ and $t_1$

The range for a target may be an average of the range values at times $t_1 \ldots t_o$ or the range value at time $t_n$, for example. Additionally, the heading relative to the Lidar measurement device 10 is calculated from the change, i.e. increase or decrease, in distance over time.

By way of example, with respect to the vehicle 26, at time $t_1$, 0.02 seconds, the range $R_{26}$=2,460.002 feet (0.466 miles) and at time $t_2$, 0.27 seconds, the range $R_{26}$=2,432.502 feet (0.461 miles). Accordingly, the data is plugged into Equation I as follows with the scaling of speed as appropriate:

v=(2,432.502 feet−2,460.002 feet)/(0.27 seconds−0.02 seconds)

v=−110 feet/second v=−75 mph=75 mph (closing)

In this operational embodiment, the range, $R_{26}$, of the vehicle is set at the range at time $t_n$. Similar calculations fill the other speed and heading data presented in Table III.

Following this creation of the target list 54 having the target data 56, the Lidar measurement device 10 integrates the target data 56, or a portion thereof, into the video such that the target data 56 is associated with the image of the appropriate targets. In one implementation, to accomplish this integration, the Lidar measurement device 10 utilizes a function, f(x", y"), to map the (x", y") coordinates of the reflected laser range-finding signals to an aspect ratio of (x, y), which may be substantially similar or identical to the video frame 44 aspect ratio of (x', y'). It should be understood that if the video frame 44 aspect ratio of (x', y') is different from the display aspect ratio of (x, y), a similar mapping may occur. The target boxes 38, 40, 42, which respectively include target data 56 ($T_2$, $T_1$, $T_3$), are inserted at the respective pixel locations f(x", y"); namely, f(110, 19), f(46, 26), and f(8, 62) in the above example. Then, as mentioned, the display image 36, which includes both the video and associated target data, furnishes positive target identification by law enforcement or other user of the Lidar measurement device 10.

Figure 1B:
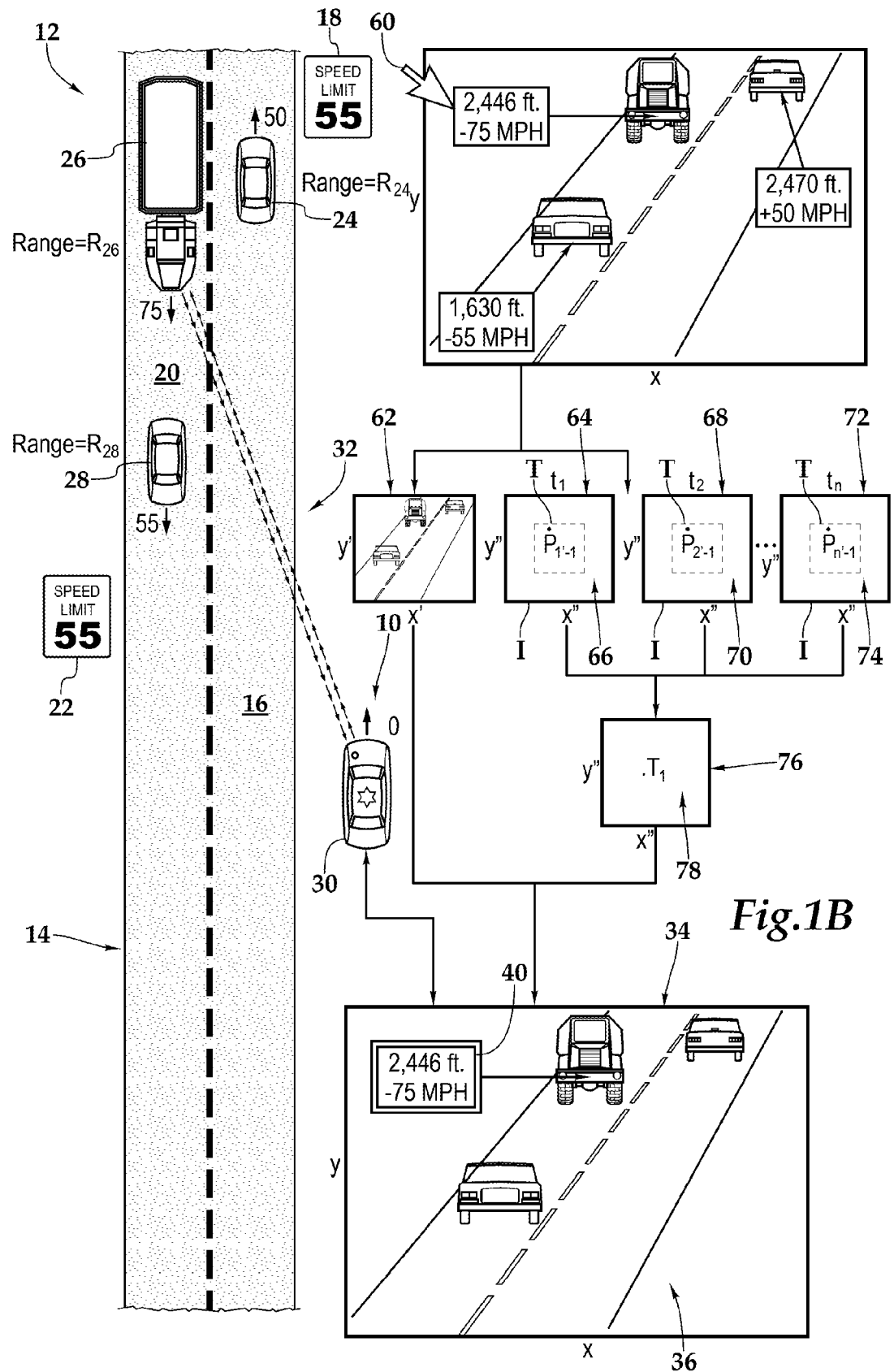
FIG. 1B depicts a schematic illustration of a multiple vehicle environment wherein one embodiment of a Lidar speed-measurement device with target tracking is being utilized to track a target.

FIG. 1B illustrates the Lidar measurement device 10 furnishing target-tracking capabilities whereby a subset of the targets within the field of view 32 are examined more frequently to reduce measurement error. Either automatically or by manual intervention, target 26, which is the fastest target, within the field of view 32, is identified for target tracking as identified by arrow 60. That is, the Lidar measurement device 10 transmitted laser range-finding signals to the field of view or identification space I, which identified three potential targets, including vehicles 24, 26, 28. The Lidar measurement device 10 then successively progressively transmits laser range-finding signals to a field of view of target space T, which is a sub-field of identification space I and includes the target 26. The target space and sub-field may be of equal or lesser size than the identification space. Moreover, the target space and sub-field may include multiple noncontiguous portions, for example in the event of tracking multiple vehicles in different portions of the field-of-view or identification space.

As previously mentioned, target speed is calculated from the change in distance across an interval of time. While it is conceptually possible to calculate speed with only two samples of distance or other minimum set, such a method may be prone to excessive speed errors because of quantization of distance and the presence of noise. Relatively small errors in the distance measurements can produce significant errors in the speed calculation as shown in the following:

$\Delta d=d_2-d_1$, wherein the change in distance is expressed in terms of $d_1$, which is the true distance to a target measured at time $t_1$, and $d_2$ is the true distance to a target measured at a time $t_2$ $\Delta t=t_2-t_1$ $v=(d_2-d_1)/(t_2-t_1)$, wherein v is true target velocity Letting E be cumulative error in Δd measured by the Lidar measurement device 10, calculated speed $v_c$ will be:

$$v_c=(\{d_2-d_1\}+E)/(t_2-t_1)$$

$$v_c=(d_2-d_1)/(t_2-t_1)+E/(t_2-t_1)$$

$$v_c=v+E/(t_2-t_1),\quad \text{Equation II}$$

This equation, Equation II, shows that an error in the distance measurements of E produces an error in the calculated speed of $E/(t_2-t_1)$ which can become unacceptably large if the time interval between measurements $(t_2-t_1)$ is short. The error can be reduced by using a long measurement interval but if this interval is made too long, undesirable side effects occur including changes in target speed during the measurement interval and a perception that the system is "sluggish."

By way of example and not limitation, the measurement interval may be 0.25 second (4 frames per second) and the speed error becomes 4*E. The maximum acceptable speed error in this application may be 1 mile per hour (1.467 feet/second) requiring distance accuracy better than 0.367 feet. This is demanding when working with weak or noisy signals. Speed errors may be reduced by accumulating multiple distance measurements at faster firing rates and then using an averaging method such as a least squares curve fit to obtain a more accurate estimate of target speed. Since the dominant errors are random, this method improves accuracy but requires that laser pulses be directed more frequently at the target. Since the laser firing rate is limited, a dual-mode system is utilized in which a full field-of-view scan (field-of-view I in FIG. 1B) is used to locate targets and then a much smaller field-of-view scan (field-of-view T in FIG. 1B) centered on a target position is used to obtain more frequent distance measurements to obtain higher accuracy.

Returning to FIG. 1B, the process of identifying or locating targets and then tracking targets is depicted. Video frame 62 is acquired, which has an aspect ratio of x' to y'. At time $t_1$, target space T, which is a sub-field of identification space I and includes the target 26 is scanned by the Lidar measurement device 10 progressively sending short pulses of infrared light directed in a narrow beam to the target space T. In one embodiment, these signals may be transmitted in the aforementioned step-wise manner wherein the sequence of transmit, pause, receive/no receive, reposition is repeated through the target space T. When the light pulse strikes a target, such as the license plate of the target vehicle 26, a portion of the reflected pulse is received by the Lidar measurement device and recorded as a hit. With respect to laser frame 64, the hits and misses may be recorded in a laser frame data array 66 which is represented as receiving reflected laser range-finding signals during the first scan at pixel $P_{1'-1}$, which corresponds to the hit on target vehicle 26.

The portion of the identification space I outside of the target space T is not scanned, so neither hits nor misses are recorded for target vehicles 24, 28. Rather, by scanning only a reduced field or sub-field, i.e., target space T, the scan is completed more rapidly. As shown, repeated scans of the target space T are made at times $t_2$ through $t_n$ which result in laser frame 68, laser frame data array 70, laser frame 72, and laser frame data array 74. The repeated hits on the target vehicle 26 are recorded at pixels $P_{2'-1}, \ldots, P_{n'-1}$. In one embodiment, the position of target space T may be periodically or continuously adjusted to track the projected movement of the target vehicle based upon historical movement and to compensate for the movement of the patrol vehicle when a moving mode of operation is being utilized.

Using the underlying velocity equation presented in Equation I, an averaging technique, least squares fit, regression analysis or other technique for modeling, analyzing, and determining a value from numerical data consisting of many data points may be utilized to determine the target data associated with the target vehicle 26. This data is shown on target list 76 having target data 78 therein. Following the creation of the target list 76 and the target data 78, the Lidar measurement device 10 integrates the target data 78, or a portion thereof, into the video image 36 such that the target data 78 is presented with the appropriate vehicle. As shown, the target vehicle 26 is presented with target data (2,446 ft., closing at 75 MPH) associated therewith. Moreover, in one implementation, to convey to the operator that the target data 78 is the result of multiple scans conducted with the target tracking functionality, the target data 78 may be presented with a double box or other special presentation.

Figure 1C:
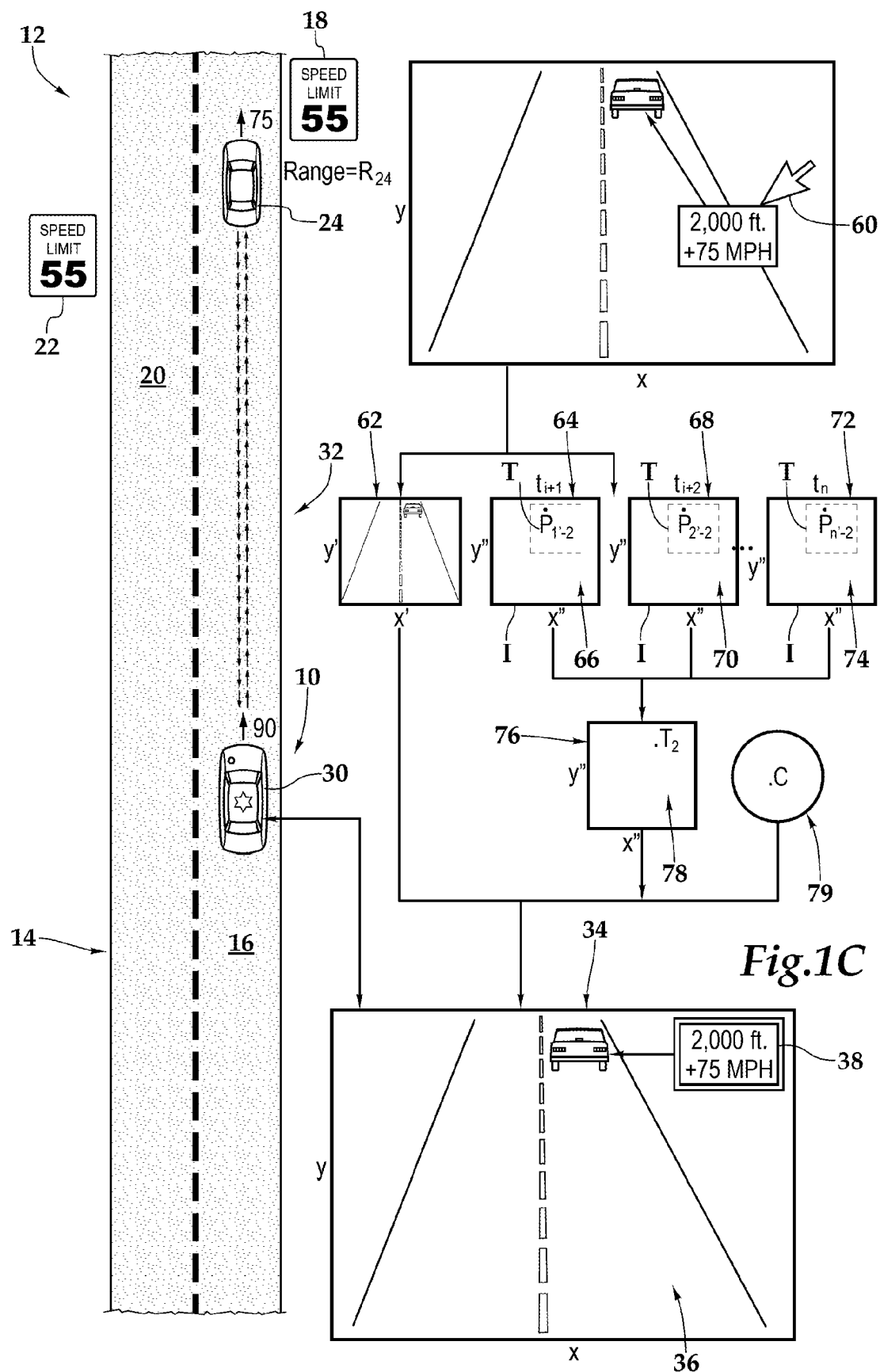
FIG. 1C depicts a schematic illustration of a multiple vehicle environment wherein another embodiment (a moving mode of operation) of the Lidar speed-measurement device with target tracking is being utilized to track a target.

FIG. 1C illustrates the Lidar measurement device furnishing target-track or target-tracking capabilities whereby a subset of the targets within the field of view 32 are examined more frequently to reduce measurement error. From FIG. 1B to FIG. 1C, the patrol vehicle 30 and the Lidar measurement device 10 have transitioned from a stationary mode of operation to a moving mode of operation. The patrol vehicle 30 is following the vehicle 24 which has rate of speed of 75 MPH wherein the process of identifying or locating targets and then tracking targets is depicted. As shown, vehicle 24 is selected (see selection arrow 60 in FIG. 1C) and video frame 62 is acquired, which has an aspect ratio of x' to y'. At times $t_{i+1}$, $t_{i+2}, \ldots, _m$, target space T, which is a sub-field of identification space I, and includes the target 24 is scanned by the Lidar measurement device 10 progressively. This yields repeated hits on the target vehicle 24 which are recorded at pixels $P_{1'-2}, \ldots, P_{n'-2}$. The data recorded at pixels $P_{1'-2}, \ldots, P_{n'-2}$ furnishes, as previously discussed, the data for $T_2$, which is then combined with cruiser movement data 79, which includes information relative to the movement of the patrol vehicle 30 and may be used in modified versions of Equations I and II to appropriately compensate the measured speed of a target vehicle. The target vehicle 24 is presented with target data (2,000 ft., opening at 75 MPH) associated therewith in image 34.

Figure 2:
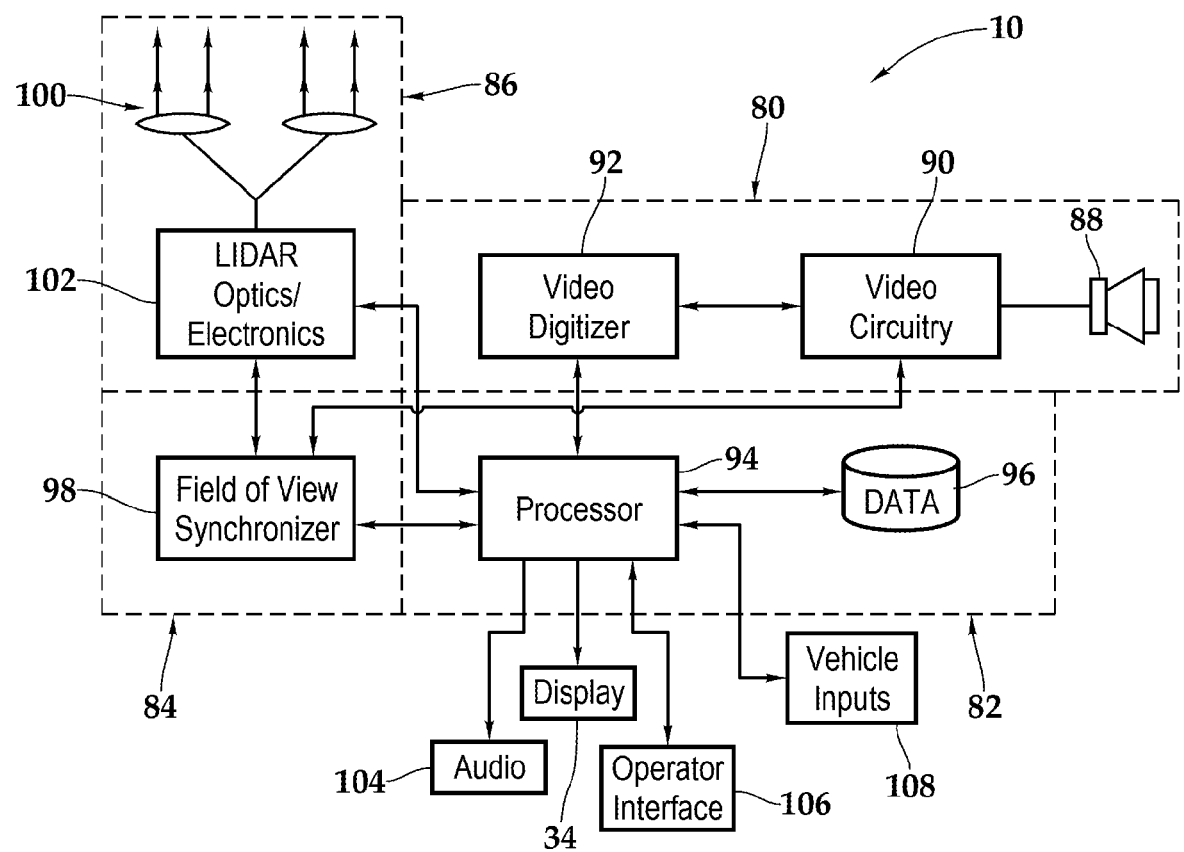
FIG. 2 depicts a schematic diagram of the Lidar speed-measurement device of FIG. 1.

FIG. 2 shows the Lidar measurement device 10 in further detail. Interconnected are a video circuitry portion 80, a processing circuit portion 82, a synchronizer circuit portion 84, and a steerable laser 86. The video circuitry portion 80 includes video equipment 88, video circuitry 90, and a video digitizer 92. In one embodiment, the video equipment 88, video circuitry 90, and video digitizer 92 capture frame-by-frame video at 60 fields per second interlaced, for example. A representative value for the field of view is 0.24 radians wide by 0.18 radians high (13.75 degrees wide by 10.31 degrees high) providing conventional 4:3 aspect ratio of a standard definition video. As discussed, the video equipment 88 may be adjusted to obtain the same field of view as the laser scanning. With respect to the video digitizer 92, in one implementation, a resolution of 640×480 is used to merge two successive fields of interlaced video to form complete frames at a rate of 30 frames per second. It should be appreciated that other resolutions are within the teachings of the present invention and the selection of a resolution represents a compromise between video quality and processing load. In the embodiment presented, however, the video resolution will be 5 times higher than the laser resolution, so one laser pixel will cover a 5×5 area of video pixels or 1 laser pixel will be 25 total video pixels.

The processing circuit portion 82 may include a processor 94 and a database 96 that provide a combination of hardware, software, and firmware for determining and handling target data. For example, a speed measurement of the target may be determined based upon range and time measurements associated with the reflected laser range-finding signals. Additionally, the processor 94 and the database 96 are able to determine range measurements and target heading based upon the range and time measurements associated with the reflected laser range-finding signals by utilizing range-finding and direction-sensing capabilities. The direction-sensing capabilities determine direction by comparing the change in distance to the change in time to determine if, over a period of time, the distance is decreasing (i.e., closing) or increasing (i.e., opening). The processing circuit portion 82 integrates the target data into the video received from the video digitizer such that the target data, such as speed, range, and direction of heading, are associated with the image of the target presented on the display 34.

The synchronizer circuit portion 84 includes the field of view synchronizer 98 that communicates with the video circuitry portion 80, processing circuit portion 82, and the steerable laser 86 to coordinate the field of views of an optical transceiver 100 and the video equipment 88. Additionally, the field of view synchronizer 98 may coordinate the aspect ratios of the processes of the video circuitry portion 80, processing circuit portion 82, and the steerable laser 86. The steerable laser 86 includes the aforementioned optical transceiver 100 which is supported by Lidar optics and electronics 102.

Audio output 104, the display 34, an operator interface 106, and vehicle inputs 108 are also connected to the processor 94. The Lidar measurement device 10 may provide audio indications of various functions through the audio output 104. The operator interface 106 may include any type of keyboard, control panel, or touchscreen, for example, that permits the user to interface with the Lidar measurement device 10. Vehicle inputs 108 may include an indication from the vehicle to the Lidar measurement device 10 of the speed of the patrol vehicle 30. In making the various range, speed, and heading calculations of target vehicles, the Lidar measurement device 10 may take into account the speed and heading of the patrol vehicle 30. As previously alluded to, this is particularly relevant for calculations in a moving mode of operation.

Figure 3:
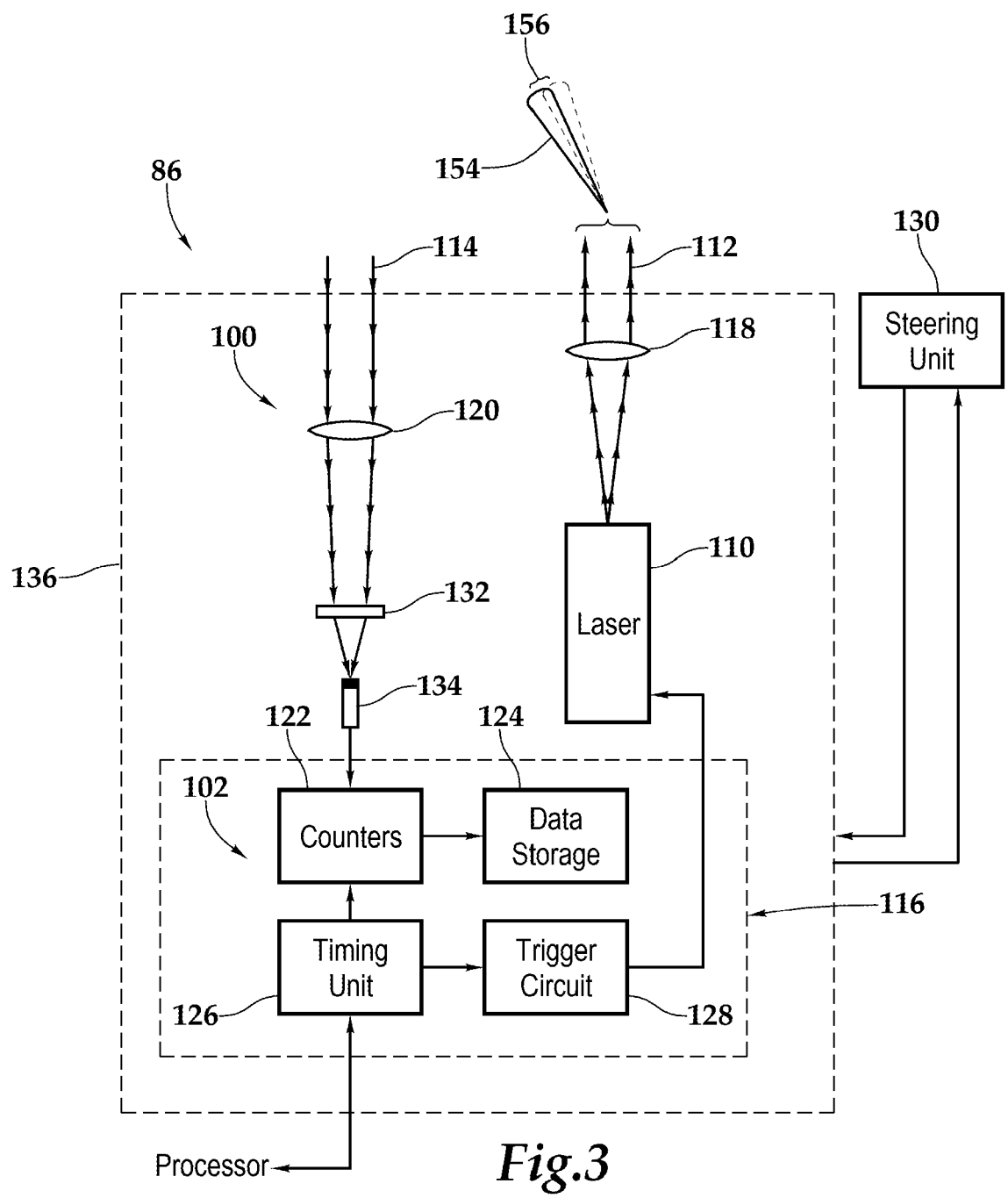
FIG. 3 depicts a schematic diagram of one embodiment of a steerable laser for the Lidar speed-measurement device of FIG. 1.

FIG. 3 illustrates one embodiment of the steerable laser 86 for the Lidar measurement device 10. The steerable laser 86 transmits laser range-finding signals 112 and receives reflected laser range-finding signals 114. With respect to the transmission, a laser 110, which is supported by electronics 116, generates a laser range-finding signal and transmits the laser range-finding signal through transmission optics 118, which is depicted as a collimating lens, and forms a portion of the optical transceiver 100. By way of the steering unit 130, the laser range-finding signal is directed to a particular location in the field of view of the steerable laser 86 and this particular location may be recorded in terms of (x",y") coordinates or other coordinate systems, for example. Following transmission, the steerable laser 86 pauses to wait for reception of a reflected laser range-finding signal. In this implementation, the steerable laser 86 has only one pulse in-flight at a time. If a reflected laser range-finding signal 114 is received, the reflected laser range-finding signal is received by the optical transceiver 100 and routed by receiving optics 120 through a filter 132 to a photodetector 134, which provides signal detection and may include an avalanche photodiode (APD), in one embodiment. If a reflected laser range-finding signal 114 is not received after a sufficient pause, then the steerable laser 86 is repositioned within the field of view and another laser range-finding signal 112 is transmitted. The detection of reflected laser-range finding signal and/or the absence of such a detection may be appropriately recorded in the data storage 124.

In one embodiment, these sending and receiving events are controlled by the dedicated hardware, which handles the high speeds and load. In one implementation, this hardware includes fast counting multiscaler counters 122 with access to data storage 124. These components work with a timing unit 126, trigger circuit 128, and a steering unit 130 to control the positioning, firing, and waiting operations that are repeated numerous times. More particularly, the steering unit 130 communicates with various portions of optical transceiver assembly 136, which includes the optical transceiver 100 and the other Lidar optics and electronics 102. As depicted, the steerable laser 86 includes a bistatic design for the optical transceiver 100 wherein the transmission and reception paths are kept separate. In one embodiment, the components of the transmission and reception paths may be rigidly mounted together within the steerable laser 86 to aim at the same point in space. In this configuration, the steering unit 30 aims the entire optical transceiver assembly 136 to scan the beam.

With respect to detection, the counters 122 may include vertical and horizontal counters that are phase locked to the field of view synchronizer signals received from the field of view synchronizer 98, which is coordinating both the fields of view for the video equipment 88 and the steerable laser 86. These synchronizer signals may be received by the steering unit 130, which coordinates the aiming and positioning of the optical transceiver 100 and, through communication with the timing unit 126, the detection at the counters 122. In one implementation, under the control of the synchronizer signals, the counters 122 produce 128 counts while scanning across a horizontal line and 96 counts while scanning vertically, where counts of 0 correspond to the left and top edges respectively of the field of view, i.e., (x", y") ∈ (0 . . . 128, 0 . . . 96).

That is, at each scan position, the optical transceiver 100 aims the laser 110 at the required point within the field of view, fires the laser 110, and the timing unit 126 measures the time of flight of any return signals or reflected laser range-finding signals. The first return signal may be processed or, in another system, multiple return signals are processed. The time of flight of each signal is stored in a 128 by 96 memory array where the position in the array corresponds to the position of the laser 110 and optical transceiver 100 in the field of view. As mentioned, if no return signal is received, a status bit is set in the stored data to so indicate. It should be appreciated that other conditions, such as errors, may also be recorded. Storage of this data may be handled by a directed memory access interface or DMA which forms a portion of the data storage 124. The DMA may be responsible for creating a status signal or interrupt that provides an indication of a memory array being completed and the repositioning of the optical transceiver 100.

In one embodiment, laser spot size 154 and scan step size 156 are selected to produce scanning overlap of adjacent pixels. By way of example, a laser spot size of 3 milliradians may be used for vehicle surveillance. A scan step size of 2 milliradians between adjacent pixels, which produces a 33% scanning overlap of adjacent pixels, may be utilized to insure that a target vehicle does not fall between successive pixels. In one implementation, the field of view of the Lidar has an aspect ratio of 4:3, which is the same as standard video resolution. In particular, the field of view may be 128 pixels wide by 96 pixels high for a total image size of 12,288 pixels. In this embodiment, the resulting angular field of view is 0.256 radians (14.67 degrees) wide by 0.192 radians (11.00 degrees) high, and the Lidar frame rate may be limited to 4.00 frames per second with a laser firing rate of 49.164 KHz. Sensitivity may be such that no target returns are expected for targets at distances greater than 10,000 feet, and for this maximum distance, the total round-trip time of flight is 20.34 μs. The laser firing rate is therefore limited to the aforementioned 49.164 KHz in this embodiment. It should be understood that the schematic depicts a layout of the Lidar optical and electronic components. It should be appreciated that the illustrated and described embodiment represents only one embodiment and other embodiments are within the teachings presented herein. By way of example, the optical transceiver 100 is depicted as having a bistatic design including transmitting optics 118 and receiving optics 120. A monostatic approach is possible as well.

Figure 4:
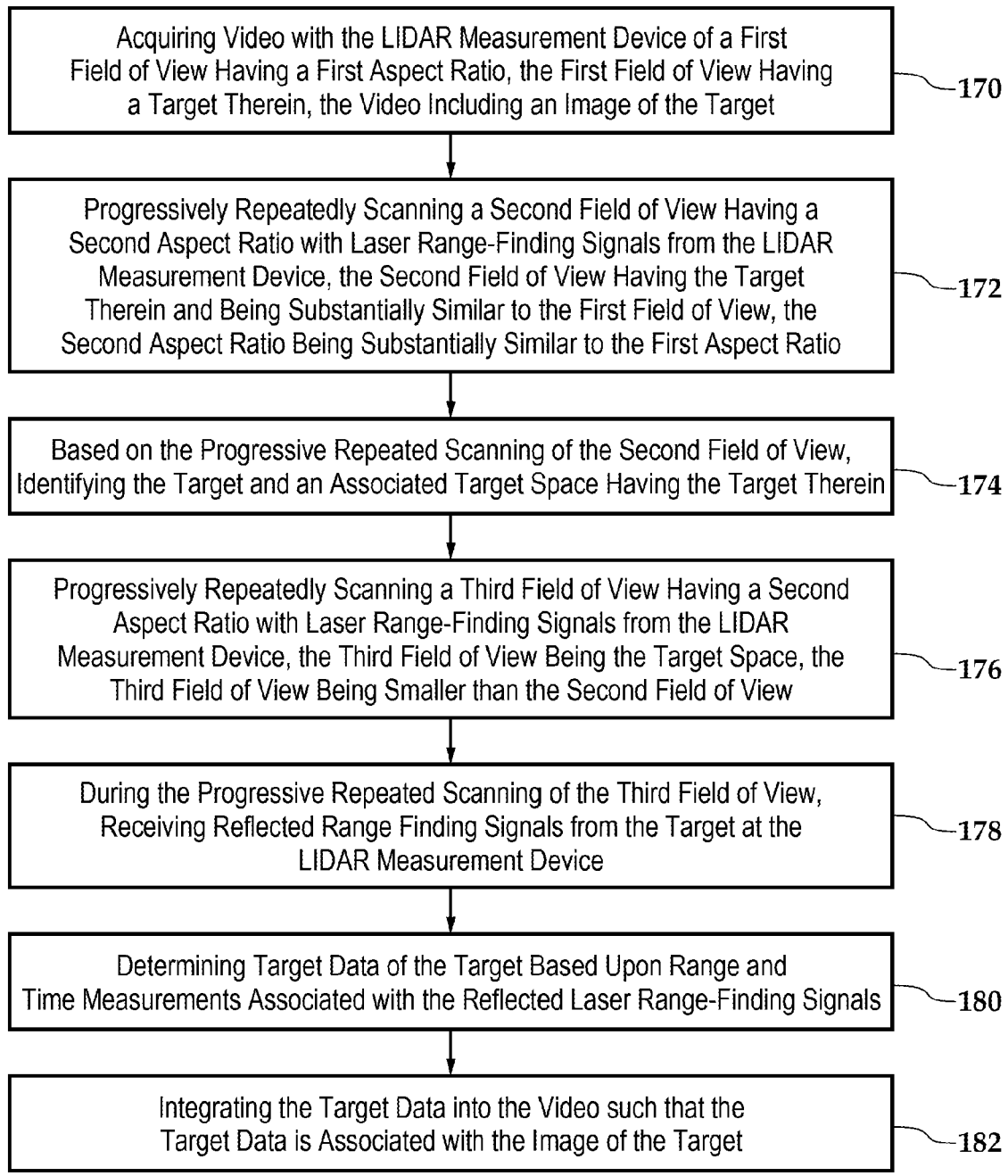
FIG. 4 depicts a flow chart of one embodiment of a method for determining target data.

FIG. 4 shows one embodiment of a method for measuring target data, such as speed, range, and heading, for example. At block 170, video is acquired with the Lidar measurement device of a first field of view having a first aspect ratio. The first field of view includes a target therein and the video includes an image of the target. At block 172, the Lidar measurement device progressively repeatedly scans a second field of view having a second aspect ratio with laser range-finding signals. The second field of view has the target therein and is substantially similar, which includes being identical, to the first field of view. The second aspect ratio is substantially similar to the first aspect ratio, wherein substantially similar includes being identical. In one embodiment, progressively repeatedly scanning the second field of view further comprises horizontal and vertical step size scanning of the second field of view.

At block 172, during the progressive repeated scanning of the second field of view, reflected range-finding signals are received from the target at the Lidar measurement device. At block 174, based upon the progressive repeated scanning of the second field of view, the target is identified as is an associated target space having the target therein. At block 176, a third field of view is progressively, repeatedly scanned. In one implementation, the third field of view is the target space and the third field of view has a second aspect ratio that is smaller than the second field of view. At block 178, during the progressive, repeated scanning of the third field of view, reflected range finding signals are received from the target at the Lidar measurement device.

At block 180, a measurement of the target, such as speed, range (or distance), and/or heading, is determined based upon range and time measurements associated with the reflected laser range-finding signals. Moreover, at this operational stage, a speed, range (or distance), and/or heading measurement of the target may be determined based upon the range and time measurements associated with the reflected laser range-finding signals. Additionally, a direction of heading of the target may be determined using direction-sensing capabilities of the processor of the Lidar measurement device that monitor the change in distance over a period of time to determine if the target is opening or closing. At this time, as part of the determination process, other data may also be considered with the formulation of the speed, range, and distance measurements. By way of example, if the patrol vehicle is in a moving mode of operation, the speed and direction of the patrol vehicle may considered when calculating the speed, range, and distance measurements of the target vehicle. Then, at block 182, the target data, whether speed measurement or other metric, is integrated into the video such that the target data is associated with the image of the target on the display.

Figure 5A:
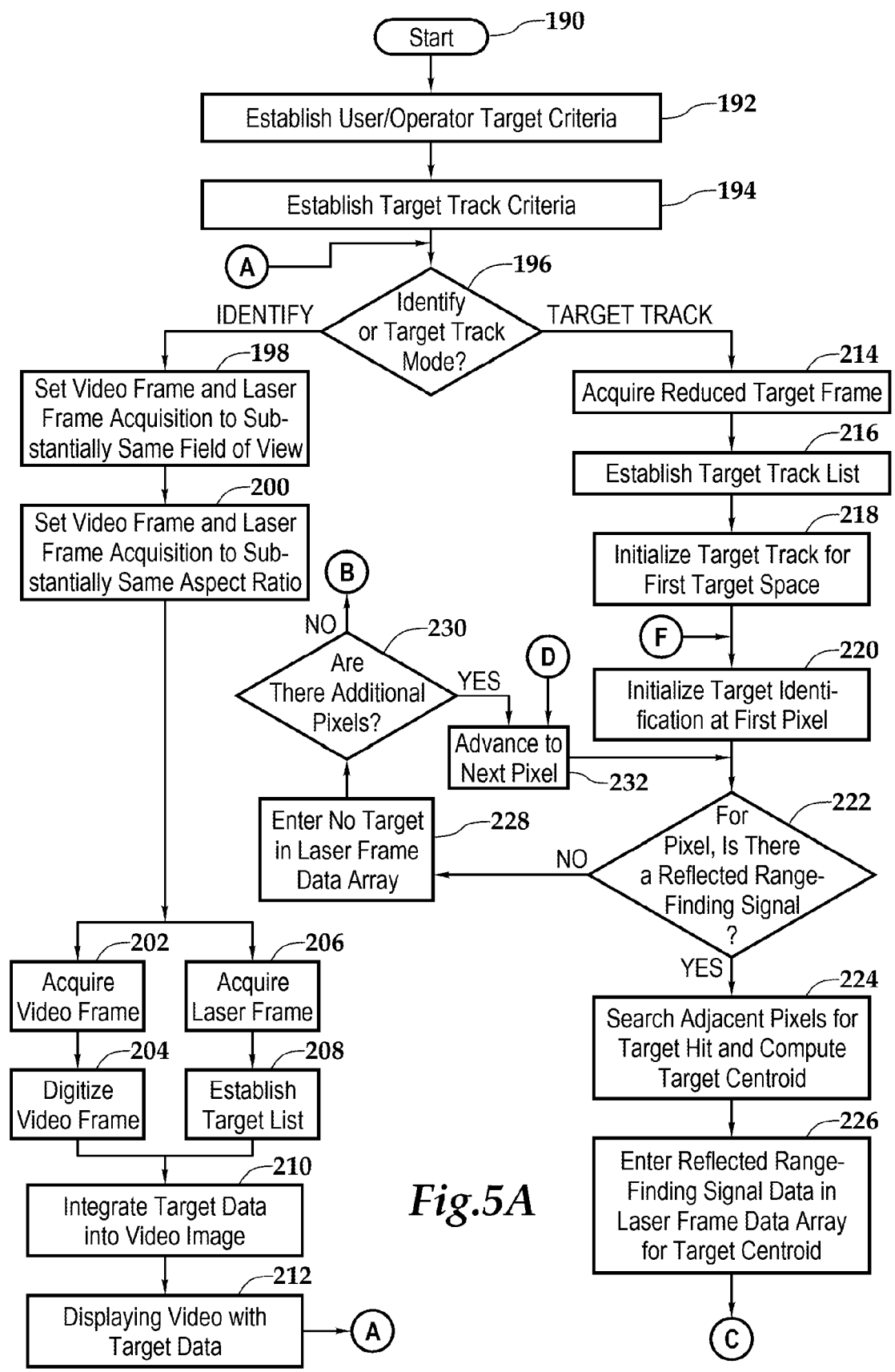
FIGS. 5A and 5B together depict a flow chart of another embodiment of a method for determining target data.
Figure 5B:
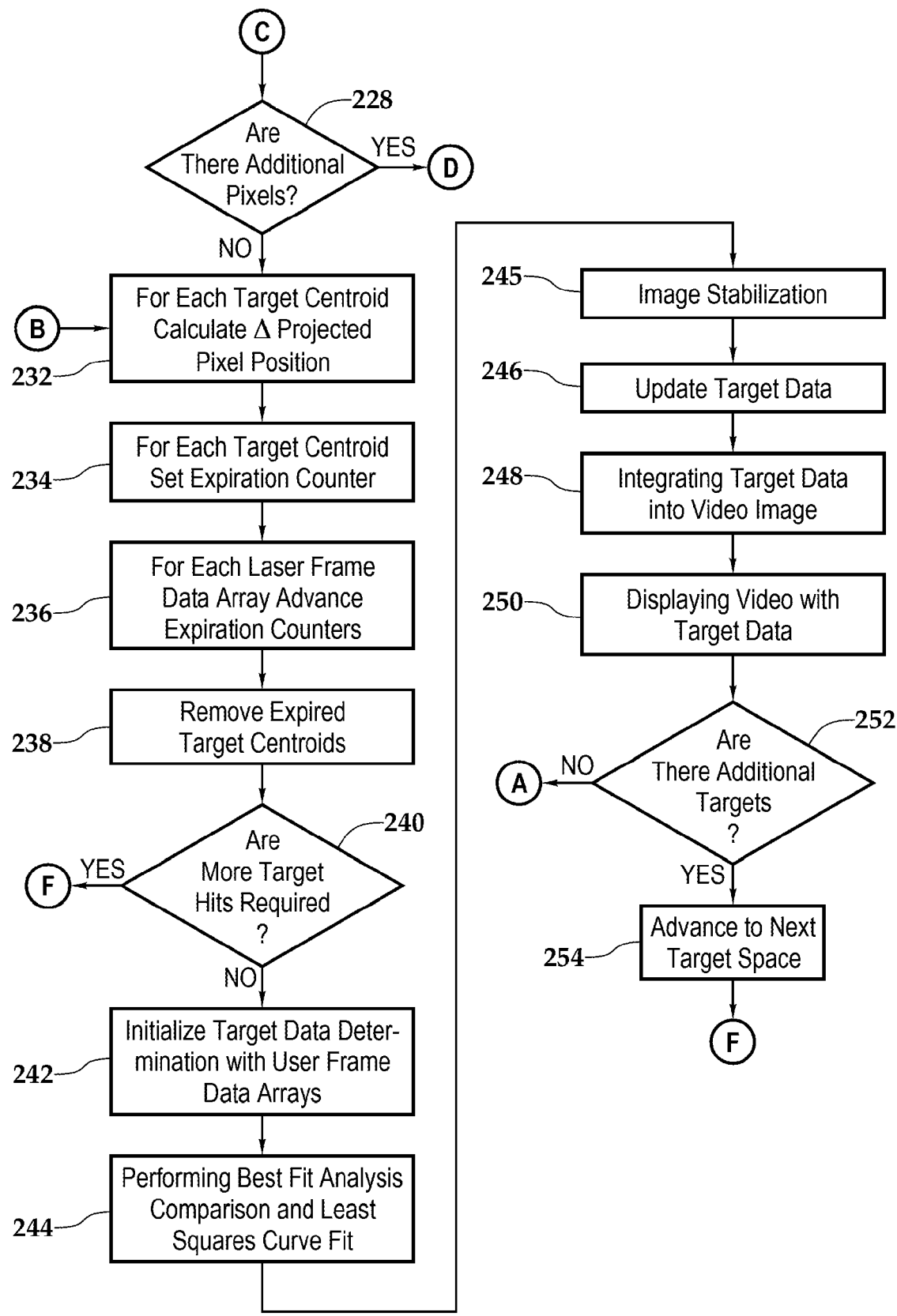
Figure 6A:
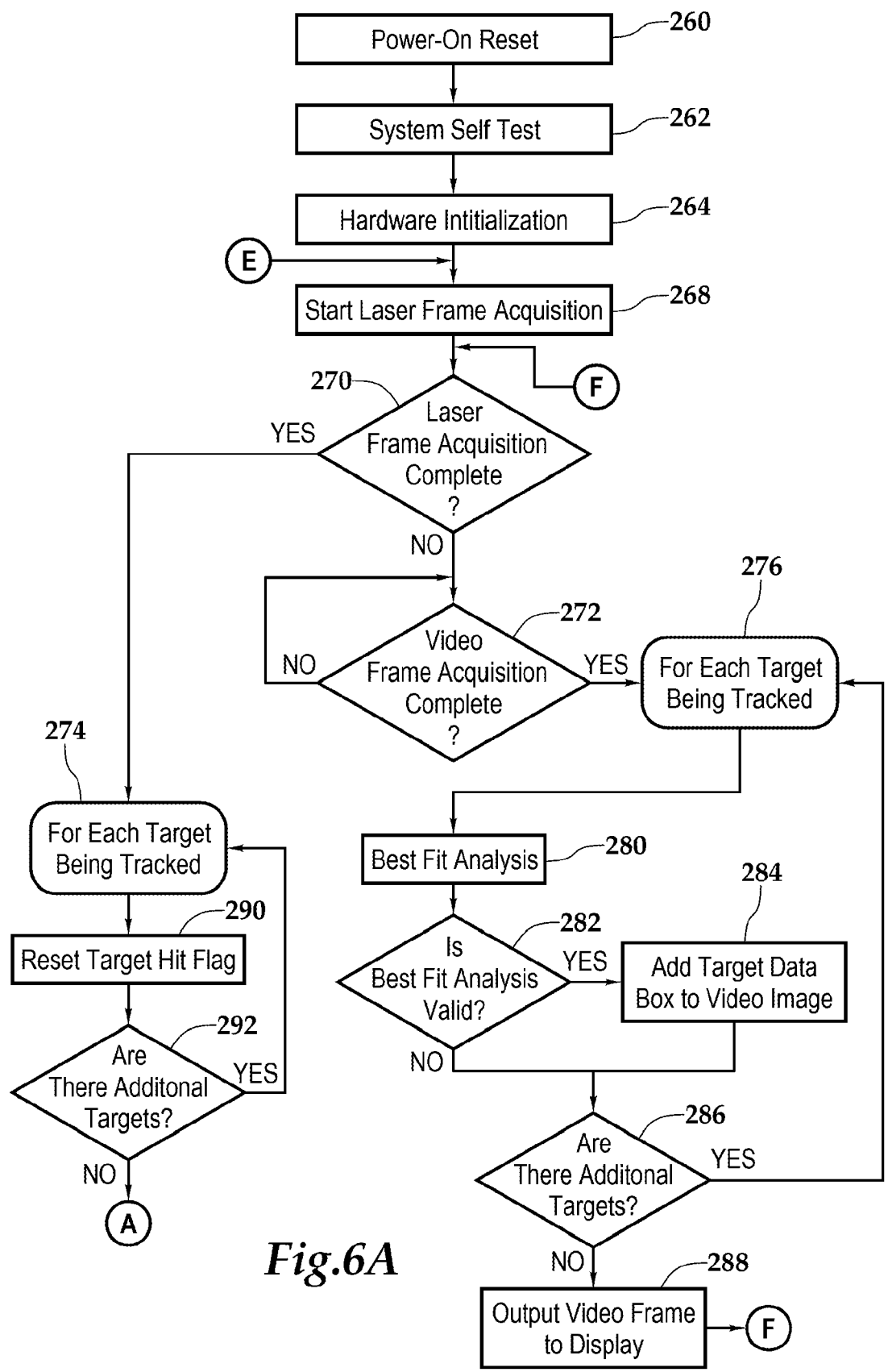
FIGS. 6A, 6B, 6C, and 6D together depict a flow chart of a further embodiment of a method for determining target data.
Figure 6B:
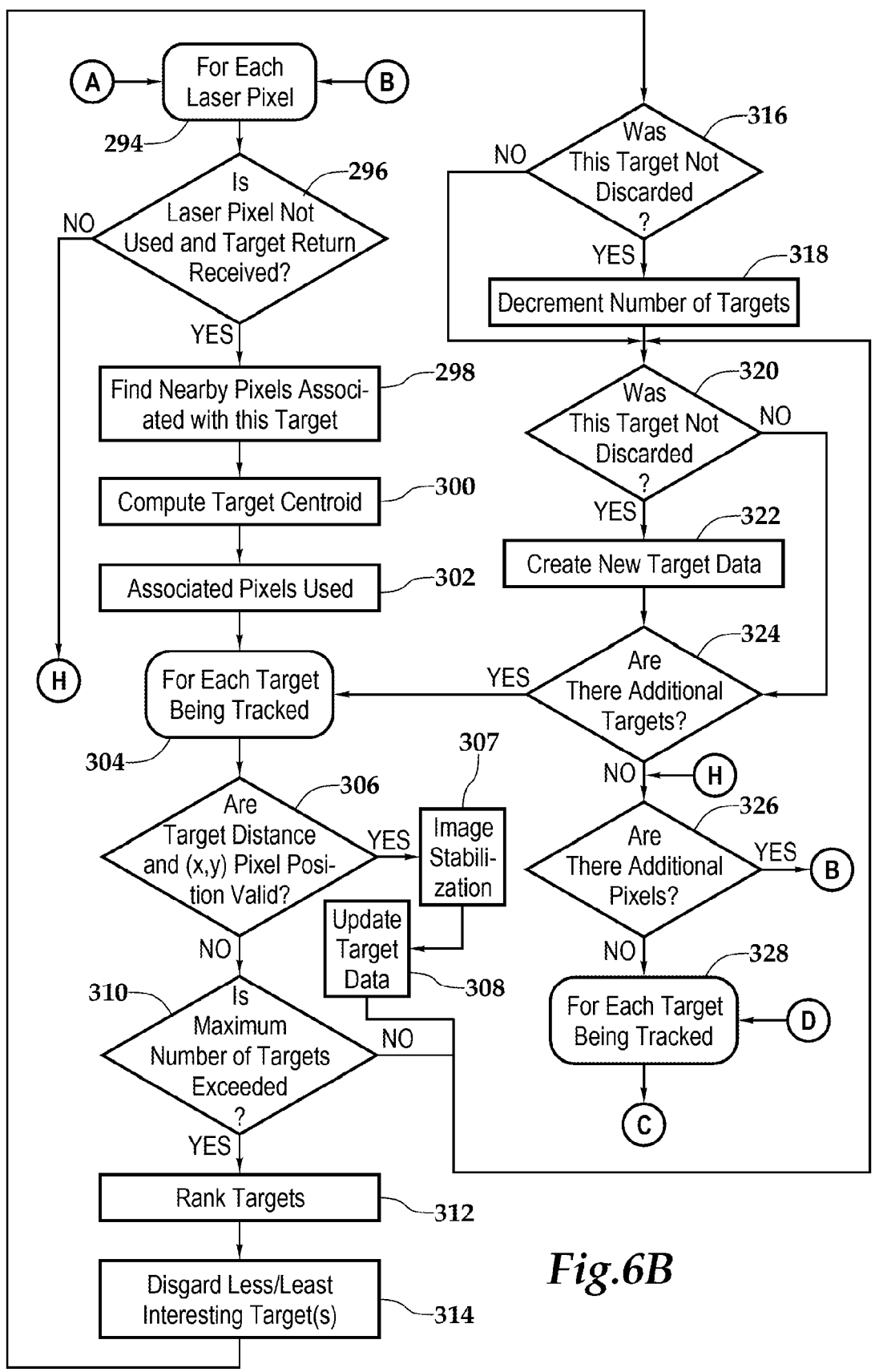
Figure 6C:
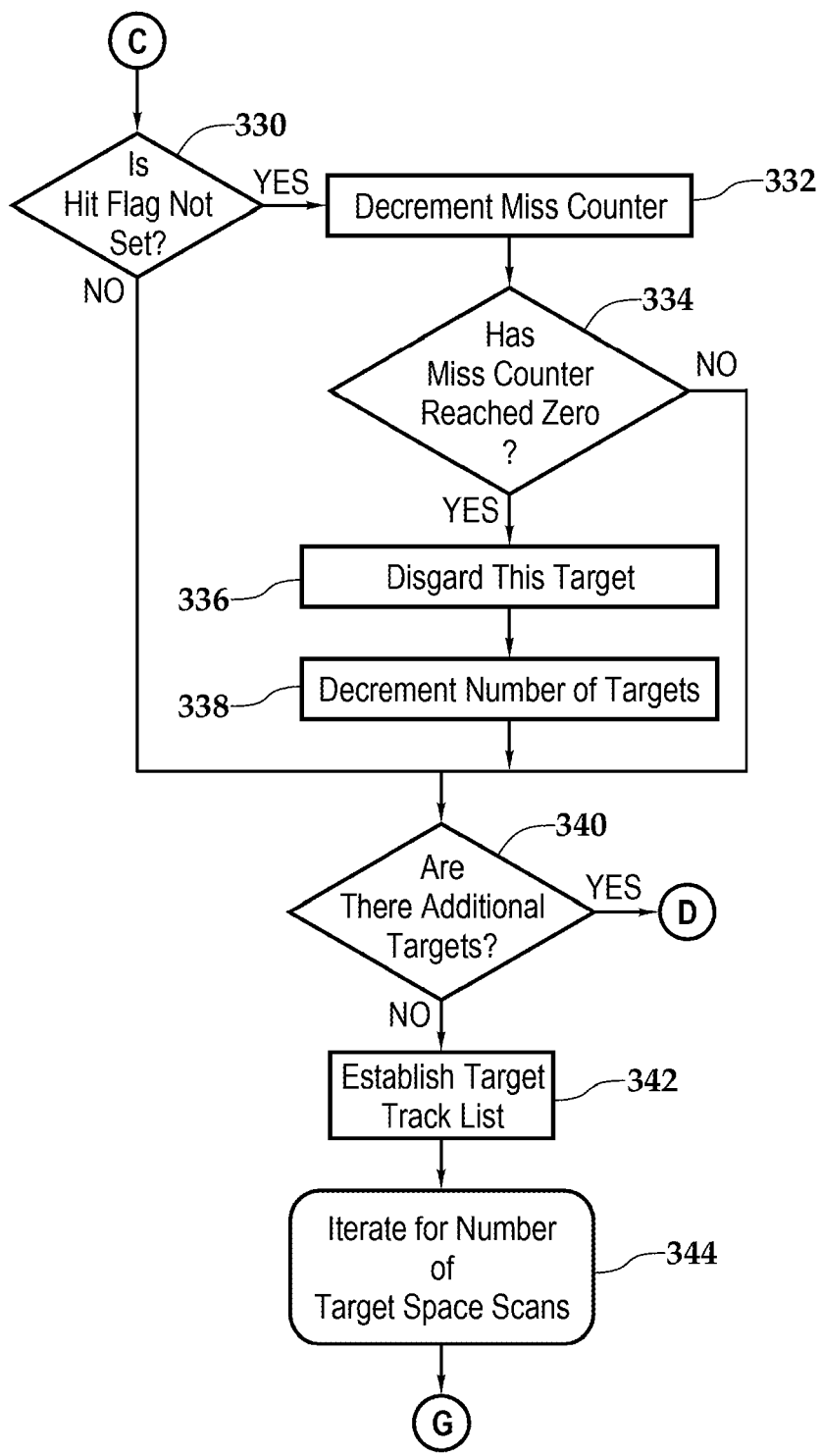
Figure 6D:
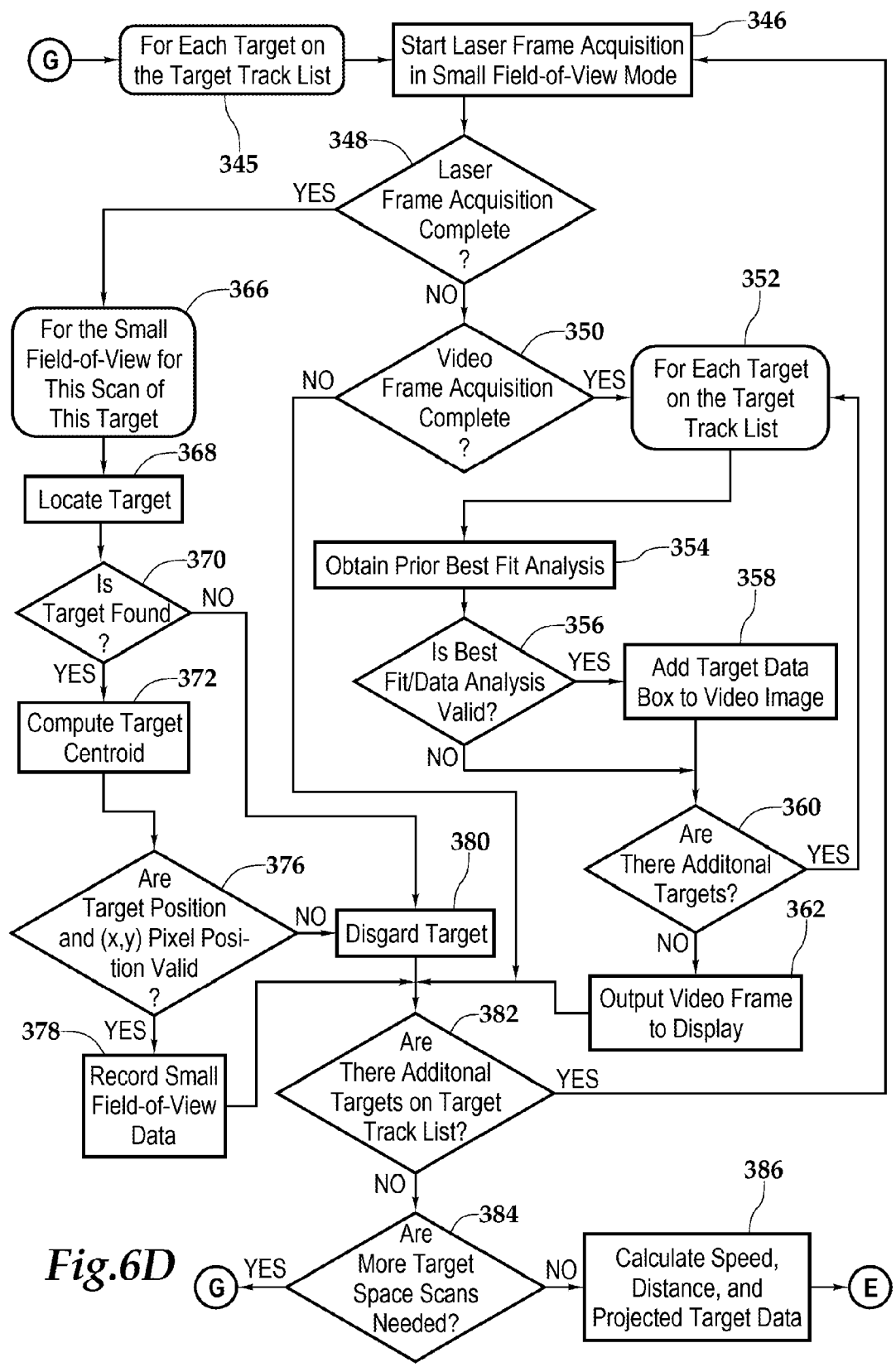

FIGS. 5A and 5B illustrate another embodiment of a method for measuring speed. The methodology starts at block 190 and then a user/operator target criteria may be established for the Lidar measurement device at block 192. By way of example, the following table, Table IV, provides a non-exhaustive matrix of the more common operator selectable modes and preferences of the Lidar system disclosed herein. Additional modes of operation and user/operator target criteria may include limiting the number of target data boxes displayed and prioritizing the target vehicles on a criteria based upon the following as well as other applications of the operator adjusted range gate criteria where a selectable interval of range of interest is provided.

TABLE IV

Common Operator Selectable Modes

| Patrol Vehicle | Type of Signal(s) | Receding/Approaching |
|---|---|---|
| Stationary | Closest and Faster | Approaching |
| Stationary | Closest and Faster | Receding or Approaching |
| Stationary | Closest and Faster | Receding |
| Stationary | Closest | Approaching |
| Stationary | Closest | Receding or Approaching |
| Stationary | Closest | Receding |
| Stationary | Faster and Range gate | Receding or Approaching |
| Moving | Closest and Faster | Approaching |
| Moving | Closest and Faster | Receding or Approaching |
| Moving | Closest and Faster | Receding |
| Moving | Closest | Approaching |
| Moving | Closest | Receding or Approaching |
| Moving | Closest | Receding |
| Moving | Faster and Range gate | Receding or Approaching |

Similarly, at block 194, a target tracking criteria may be established. This criteria may be similar to or a particular subset or prioritized subset of the criteria discussed at block 192. At decision block 196, two process pathways are presented: one for the identify mode of operation and the other for the tracking mode of operation. Examining the identify mode of operation first, at block 198, video frame and laser frame acquisition are set to substantially the same field of view and then, at block 200, the video frame and laser frame acquisition are set to substantially the same aspect ratios. It should be appreciated that in one embodiment, the fields of view and/or the aspect ratios may be pre-set. Following block 200, operations at blocks 202/204 and 206/208 occur substantially simultaneously. More particularly, at block 202, the Lidar measurement device acquires video frames before digitizing the video frames at block 204.

Returning to block 206, the Lidar measurement device acquires the laser frame prior to establishing the target list at block 208. A more detailed discussion of acquisition of the laser frame and establishment of the target list may be found in the following commonly owned, co-pending patent application: "Lidar Measurement Device for Vehicular Traffic Surveillance and Method for Use of Same," filed on Jul. 28, 2009, application Ser. No. 12/510,876, in the name of Robert S. Gammenthaler; which is hereby incorporated by reference for all purposes. At block 210, the target data is integrated into the video image and then the video is displayed with the target data at block 212 following which, the methodology returns to decision block 196 where if target tracking or track mode is enabled, the process advances to block 214.

At block 214, based on the established target tracking criteria, a reduced target frame is acquired about the target space of a particular target. By way of example, the target tracking criteria may have been to select a target vehicle or target vehicles traveling above a particular speed within a particular range gate. A target tracking or track list is established based upon the reduced target frame or target frames selected for further examination at block 216. Then, at block 218, the target tracking process is initialized for the first target space and target identification is initialized at the first pixel in the laser frame at block 220. At decision block 222, for the pixel under examination, if there is a reflected laser range-finding signal, then the methodology advances to block 224 wherein adjacent pixels are searched for target hits and the associated target centroid is calculated. Once the target centroid is defined, then the reflected laser range-finding signal data is entered into the laser frame data array at block 226 and the methodology advances to decision block 228. If there are additional pixels then the methodology continues to block 232 where the target identification methodology advances to the next pixel before returning to decision block 222. Otherwise, once all of the pixels have been examined, the target identification methodology advances from decision block 228 to block 232.

Returning to decision block 222, if there is not a reflected laser range-finding signal, then the methodology advances to block 228, wherein in the laser frame data array a notation is entered that for the particular pixel under examination there is no target. The methodology advances to decision block 230, wherein if there are additional pixels, then at block 232, the target identification process advances to the next pixel before returning to decision block 222. At decision block 230, if the target identification has exhaustively examined all of the pixels, then the methodology continues to block 232.

Once all of the pixels have been examined and the laser frame data array constructed, for each target centroid, a delta projected pixel position is calculated at block 232 and, at block 234, expiration counters are set for each target centroid. Next, at blocks 236 and 238, respectively, for each laser frame data array, the expiration counter is advanced and the expired target centroids and/or expired laser frame data arrays are removed. At decision block 240, if more target hits or laser frames are required for the comparison in order to minimize the aforementioned types of error, then the methodology returns to block 220. Otherwise, the process advances to block 242.

With multiple laser frame data arrays available for analysis, at block 242, target data determination is initialized and continues at block 244, where a best fit analysis comparison is executed. Moreover, at this block, based on the data set collected, a least squares curve fit or other data analysis tool is performed. As previously discussed, to identify targets, for example, the best fit analysis in combination with the least squares curve fit, compares the pixel positions of the reflected laser range-finding signals and verifies that the range and time measurements are valid. At block 245, as part of comparing the pixel positions, image stabilization may occur using any one of a family of techniques known in the art to increase the stability of the image and particularly, the continuity. Any one or more of a family of techniques may be utilized to increase video frame-to-video frame continuity. Non-limiting examples of stabilization techniques include gyro-based stabilization or camera-body stabilization techniques and electronic video stabilization techniques involving making the optimized match between successive video frames or digital image stabilization techniques using pixels outside the border of the visible frame to provide a buffer for the motion, for example. It should be understood that the image stabilization may occur as shown at block 245 or at one or more other blocks during the methodology.

At block 246, target data and history are updated. At block 248, the target data is integrated into the video image. At block 250, the video including the target data appropriately associated with the targets is displayed. At decision block 252, if there are additional target spaces to examine, then the process advances to block 254 then returning to block 220. Otherwise, the methodology returns to decision block 196.

FIGS. 6A, 6B, 6C, and 6D together illustrate a further embodiment of one embodiment of a method for measuring speed. The following glossary in Table V enumerates the variables utilized in this embodiment of the methodology. It should be appreciated that these are non-limiting working examples of variables wherein the functions, values, and relationships are solely representative of those which can be employed, and are not exhaustive of those available and operative.

TABLE V

Variables and Definitions

| Variable | Definition |
| --- | --- |
| number_of_targets | number of target vehicles |
| best_fit_distance | validity of the range measurements from different laser frames |
| best_fit_speed | validity of the speed measurements from different laser frames |
| hit_flag | hit flag for particular signal |
| target_distance | Range of particular target |
| x_position | x" position in (x", y") of target |
| y_position | y" position in (x", y") of target |
| distance_window | window for acceptance of a new distance reading as associated with the distance of a target already being tracked |
| projected_distance | projected distance for target |
| x_window | window for acceptance of a new x" coordinate as associated with the x" coordinate of a target already being tracked |
| y_window | window for acceptance of a new y" coordinate as associated with the y" coordinate of a target already being tracked |
| projected_x_position | projected x" position in (x", y") of target |
| projected_y_position | projected y" position in (x", y") of target |
| delta_distance | projected Δ distance for target |
| last_target_distance | last distance for target |
| delta_x | Δx" for target |
| delta_y | Δy" for target |
| miss_counter | counter for target misses |
| max_targets | criteria for maximum number of targets |
| last_x_position | previous x" position in (x", y") of target |
| last_y_position | previous y" position in (x", y") of target |
| number_of_target_space_scans | number of scans required to reduce error to acceptable margin |

At block 260, the methodology begins with a power-on reset. At blocks 262 and 264, the Lidar measurement device respectively proceeds through a system self-test and a hardware initialization, which may also include a software initialization. At block 268, laser frame acquisition is started. At decision block 270, if laser frame acquisition is not complete then the process continues to decision block 272. Otherwise, the methodology advances to for-each block 274.

At decision block 272, if video frame acquisition is complete, then this embodiment of the technique moves to for each block 276. On the other hand, if the video frame acquisition is not yet complete, then this embodiment of the technique waits at block 272. It should be appreciated that in one implementation that the video frame acquisition will be faster than the laser frame acquisition and this timing differential will play a role in the methodology. Additionally, in one embodiment, the video frame acquisition continuously runs and fills a buffer.

Returning to for-each block 276, the process advances to block 280 and a best fit analysis. At decision block 282, if the best fit analysis is valid, then the process advances to block 284, where a target data box is added to the video image with the target data. The best fit analysis is valid if the following are true:

best_fit_distance and best_fit_speed are valid

On the other hand, if the best fit analysis is not valid, the methodology advances to decision block 286. In one embodiment, at this time, as part of the determination process, other data may also be considered with the formulation of the speed, range, and distance measurements. By way of example, if the patrol vehicle is in a moving mode of operation, the speed and direction of the patrol vehicle may be considered when calculating the speed, range, and distance measurements of the target vehicle. Similarly, following the addition of the target data box at block 284, the methodology advances to decision block 286.

At decision block 286, as a part of the for-each loop initiated at block 276, if there are additional targets then the process returns to for-each block 276. Otherwise, the output video frame with the target data box or target data boxes is output and displayed to the operator at block 288. In one implementation, the operations of blocks 272-288 update the video image for each new video frame received, while waiting for a new laser frame. Following block 288, the process returns to decision block 270 in one implementation.

Returning to decision block 270, in instances where the laser frame acquisition is complete, the process continues to for-each block 274, wherein the target hit flag is reset (e.g., reset hit-flag) for a particular target at block 290 before continuing to decision block 292, where if the there are additional targets requiring reset hit flags, the methodology loops back through the for-each block 274 and block 290 until all target hit flags are reset.

Then, for-each block 294 initiates another for-each sequence; this for-each sequence being for each laser pixel. At decision block 296, a test is made to see if the particular pixel under examination has not been marked as used and that a target return is received, such as a reflected laser range-finding signal. A "NO" decision causes processing to proceed to decision block 326, which will be discussed in more detail below. On the other hand, a "YES" decision at block 296 causes the process to continue to block 298. At block 298, a search of nearby pixels is made to find any pixels containing a target return at substantially the same distance, as determined by target distance within +/−a distance window (distance_window) of the target under examination. That is, in this block, nearby pixels are found that are associated with this particular target. Processing continues to block 300 in which the centroid of the pixels identified in block 298 is computed. Processing continues to block 302 in which the pixel under examination and all pixels associated with this target are marked as used.

Following block 302, the process continues to another for-each sequence for each target being tracked beginning with for-each block 304. At decision block 306, if the target distance and (x, y) pixel position are valid, then the process advances to blocks 307 and 308. In one embodiment, the validity logic at block 306 is performed by the following coded operations:

If target_distance within +/−distance_window from projected_distance and x_position within +/−x_window from projected_x_position and y_position within +/−y_window from projected_y_position At block 307, image stabilization may occur to eliminate visible frame-to-frame jitter in the video. The updating methodology may be executed by one of the following coded operations on successive pixels in one embodiment:

(x_position, y_position)=image_stabilization(x_position, y_position)
    OR
    (projected_x_position, projected_y_position)=image_stabilization(projected_x_position, projected_y_position)

As described, in one embodiment, the (x, y) positions of particular pixels or the projected (x, y) positions may be adjusted. At block 308, the target data is updated. The updating methodology may be executed by the following coded operations in one embodiment:

delta_distance=target_distance−last_target_distance
    last_target_distance=target_distance
    delta_x=x_position−last_x_position
    last_x_position=x_position
    delta_y=y_position−last_y_position
    last_y_position=y_position
    projected_distance=target_distance+delta_distance
    projected_x_position=x_position+delta_x
    projected_y_position=y_position+delta_y
    set hit_flag
    miss_counter=(Allowable Misses)
    distance_window=5 feet
    x_window=(X window size)
    y_window=(Y window size)

Following the update of the target data at block 308, the methodology advances to decision block 320 where a check is made to see if the current target has been discarded. Returning to decision block 306, a "NO" decision causes processing to advance to decision block 310, the targets are ranked by a default or operator criteria. The methodology at block 310 may be executed by the following coded operations in one embodiment:

If number_of_targets>max_targets

Then at block 314, the less or least target or targets are discarded so that the maximum number of targets is not exceeded. At decision block 316, if the target was not discarded then the number of targets is modified at block 318. This methodology may be executed by the following coded operations in one embodiment:

number_of_targets=number_of_targets−1

The process then advances to decision block 320. Also, as is shown on FIG. 6B, following a "NO" decision at decision block 316, the methodology also advances to decision block 320, where if the target was not discarded then new target data is created at block 322 before advancing to decision block 324, which closes up the for-each loop begun at block 304 and indicates that if there are additional targets, then the methodology returns to for-each block 304. If all targets have been processed, the methodology advances to decision block 326, which terminates the for-each loop started at block 294. If additional laser pixels require processing, then the methodology returns to for-each block 294. Returning briefly to block 322, the creation of the new target data may involve the following operations in one embodiment:

Create new target:
    number_of_targets=number_of_targets+1
    last_target_distance=target_distance
    last_x_position=x_position
    last_y_position=y_position
    projected_distance=target_distance
    projected_x_position=x_position
    projected_y_position=y_position
    set hit_flag
    miss_counter=3
    distance_window=100 feet
    x_window=5 pixels
    y_window=5 pixels
    best_fit_distance=last_target distance
    best_fit_speed=invalid Continuing onto the for-each loop initiated at block 328, at decision block 330, if the hit flag is not set, then the miss counter is decremented at block 332 where following the decrement of the counter, if the counter has expired or equals zero, then at decision block 334, the process proceeds to block 336 where the target is discarded and then onto block 338 so that the number of targets may be modified by decrementing the number of targets. Returning briefly to blocks 330 through 338 as a whole, the following methodology may be utilized to implement these operations in one embodiment:

If hit_flag not set then miss_counter=miss_counter−1
If miss_counter=0, then discard(target) and number_of_targets=number of targets−1

With respect to a "NO" decision at decision block 330, a "NO" decision at decision block 334, and following the processing at block 338, the method continues onto decision block 340, where if there are additional targets to process, then the for-each loop initiated at block 328 continues; else the process advances to block 342. At block 342, the target track list is established that includes the targets of interest based upon a target selection criteria and the target spaces to be examined.

At iteration block 344, an iterative process is initiated for the number of target space scans required in order to increase the scanning frequency of a target space, which relates to reducing the error as previously discussed in detail. The following methodology may be utilized to implement this operation in one embodiment:

For i=1 to number_of_target_space_scans

At block 345, a for-each loop is initiated for each target on the target track list. Continuing to block 346, the laser frame acquisition is initialized in the small field-of-view mode. At block 348, if the laser acquisition is not complete, then the process advances to decision block 350 where if the video frame acquisition is complete the process continues to for-each block 352, else it advances to decision block 382, which will be discussed below. In one implementation, video frame acquisition may be an autonomous process. It is presented, however, for purposes of explanation as a process integrated with the laser frame acquisition process. At block 352, a for-each loop is initiated where for each target on the target track list, the prior determined best fit analysis is obtained. At block 356, if the best fit analysis is valid and sufficient laser frames have been acquired, then the target data, such as speed, range, and/or direction of heading, is added to the video image at block 358. On the other hand, if the best fit data is inadequate or insufficient, then the data is appropriately discarded or held until additional data points may be gathered. Continuing to decision block 360, if there are additional targets then the methodology continues through the for-each loop initiated at block 352. It should be understood that the video frame acquisition process of blocks 350-360 may separate from or integrated with laser frame acquisition, as discussed. When there are no additional targets, the process continues to block 362 wherein the video image containing the target data is sent to the display and the process continues to block 382.

Returning to decision block 348, if the laser frame acquisition is complete, then a for-each loop begins at block 366 wherein for the small field-of-view mode, for this target in this scan, the target is located (block 368) and if the target is found (decision block 370), the centroid is computed at block 372. At decision block 376, if the target distance, target x_position, and target y_position are valid, then the time, distance, centroid x position, centroid y position, and other relevant data are recorded for the small field-of-view mode at block 378.

Returning to the "NO" in decision block 370 and the "NO" in decision block 376, if the target was not found or if the target position or pixel position were not valid, the target is discarded before proceeding to decision block 382, where blocks 350, 362, and 378 also join the process. At decision block 382, if there are additional targets on the target track list, then the process returns to the for-each loop begun at block 346, else the process advances to decision block 384 where if additional target space scans are required to reduce error and calculate speed, then the process returns to block 345; else, the process advances to block 386. At block 386, from data in the small field-of-view mode, speed, distance and projected target position are calculated for each target on the target track list before the process continues to block 268.

For blocks 346 through 386, the following methodology may be utilized to implement these operations in one embodiment:

```
For each target being tracked
{
    j=0
    For I =1 to number_of_fast frames
    {
        Start laser frame acquisition in small field-
        of-view mode centered on last_x_position,
        last_y_position
        While laser frame not complete
        {
            If video frame complete
            {
                For each target being tracked
                {
                    If best_fit_distance and
                    best_fit_speed are valid, add
                    data box to video image
                }
                Output video frame to monitor
            }
        }
        Locate target within frame
        If target found
        {
            distance[j] = target_distance
            time[j] = I
            j = j + 1
        }
    }
    least_squares_fit[j] (in distance and time arrays) =
    best_fit_distance and best_fit speed
}
```

As previously discussed, the target tracking functionality enables a high frequency of scans to be made in a small area to reduce the error associated with target data collected relative to a target vehicle.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for operating a vehicular traffic surveillance Lidar measurement device, the method comprising: acquiring video with the Lidar measurement device of a first field of view having a first aspect ratio, the first field of view operably having a target therein, the video including an image of the target;
progressively repeatedly scanning a second field of view having a second aspect ratio with laser range-finding signals from the Lidar measurement device, the second field of view operably having the target therein and being substantially similar to the first field of view and being an identification space, the second aspect ratio being substantially similar to the first aspect ratio; based on the progressive repeated scanning of the second field of view, identifying the target and a target space having the target therein;

progressively repeatedly scanning a third field of view having a second aspect ratio with laser range-finding signals from the Lidar measurement device, the third field of view being the target space, the third field of view being smaller than the second field of view, the portion of the identification space outside of the target space is not scanned;

during the progressive repeated scanning of the third field of view, receiving reflected laser range-finding signals from the target at the Lidar measurement device;

determining target data of the target based upon range and time measurements associated with the reflected laser range-finding signals; and integrating the target data into the video such that speed measurement is associated with the image of the target.

2. The method as recited in claim 1, further comprising adjusting the position of the target space to track the projected movement of the target.

3. The method as recited in claim 2, wherein the adjusting is one of periodic or continuous and the adjusting is based upon historical movement of the target to compensate for the movement of a patrol vehicle within which the vehicular traffic surveillance Lidar measurement device is mounted when a moving mode of operation is being utilized.

4. The method as recited in claim 1, further comprising producing a scanning overlap of adjacent pixels of the reflected laser range-finding signals to insure that a target does not fall between successive pixels.

5. The method as recited in claim 1, wherein the determining target data includes a speed and direction of a patrol vehicle within which the vehicular traffic surveillance Lidar measurement device is mounted.

6. The method as recited in claim 1, wherein the integrating the target data into the video further comprises:
    adding a target data box into the video with the target data; and
    when multiple targets are within the identification space, limiting the number of target data boxes being displayed.

7. The method as recited in claim 1, wherein the integrating the target data into the video further comprises when multiple targets are within the identification space, prioritizing the multiple targets.

8. The method as recited in claim 1, the method further comprising:
    acquiring a reduced target frame, of a laser frame, about the target space of the target;
    when there is a reflected laser range-finding signal for a pixel of the laser frame, searching adjacent pixels for hits related to the target; and
    calculating a centroid associated with the target.

9. The method as recited in claim 8, further comprising establishing a track list based upon the reduced target frame.

10. The method as recited in claim 9, further comprising:
    after examining all of the pixels of the laser frame, for each centroid:
        calculating a delta projected pixel position; and
        setting an expiration counter; and
    for each laser frame removing centroids based on the expiration counter.

11. The method as recited in claim 10, wherein the establishing a track list is further based upon a target selection criteria that includes any of whether a patrol vehicle within which the vehicular traffic surveillance Lidar measurement device is mounted is moving or stationary, whether the target is closest, fastest, or within a range gate, and whether the target is receding or approaching.

12. The method as recited in claim 1, further comprising enabling a high frequency of scans to be made in the target space to reduce error associated with target data collected relative to the target.

13. A system for operating a vehicular traffic surveillance Lidar measurement device, the system comprising:
    means for acquiring video with the Lidar measurement device of a first field of view having a first aspect ratio, the first field of view operably having a target therein, the video including an image of the target;
    means for progressively repeatedly scanning a second field of view having a second aspect ratio with laser range-finding signals from the Lidar measurement device, the second field of view operably having the target therein and being substantially similar to the first field of view and being an identification space, the second aspect ratio being substantially similar to the first aspect ratio;
    based on the progressive repeated scanning of the second field of view, means for identifying the target and a target space having the target therein;
    means for progressively repeatedly scanning a third field of view having a second aspect ratio with laser range-finding signals from the Lidar measurement device, the third field of view being the target space, the third field of view being smaller than the second field of view, the portion of the identification space outside of the target space is not scanned;
    during the progressive repeated scanning of the third field of view, means for receiving reflected laser range-finding signals from the target at the Lidar measurement device;
    means for determining target data of the target based upon range and time measurements associated with the reflected laser range-finding signals; and
    means for integrating the target data into the video such that speed measurement is associated with the image of the target.

14. The system as recited in claim 13, further comprising means for adjusting the position of the target space to track the projected movement of the target.

15. The system as recited in claim 14, wherein the adjusting is one of periodic or continuous and the adjusting is based upon historical movement of the target to compensate for the movement of a patrol vehicle within which the vehicular traffic surveillance Lidar measurement device is mounted when a moving mode of operation is being utilized.

16. The system as recited in claim 13, the system further comprising:
    means for acquiring a reduced target frame, of a laser frame, about the target space of the target;
    means for searching adjacent pixels for hits related to the target when there is a reflected laser range-finding signal for a pixel of the laser frame; and
    means for calculating a centroid associated with the target.

17. The system as recited in claim 16, further comprising means for establishing a track list based upon the reduced target frame.

18. The system as recited in claim 17, further comprising:
    means for calculating a delta projected pixel position and for setting an expiration counter, the calculating and the setting are after examining all of the pixels of the laser frame and for each centroid;
    means for removing centroids based on the expiration counter, for each laser frame.

19. The system as recited in claim 18, wherein the means for establishing a track list is further based upon a target selection criteria that includes any of whether a patrol vehicle within which the vehicular traffic surveillance Lidar measurement device is mounted is moving or stationary, whether the target is closest, fastest, or within a range gate, and whether the target is receding or approaching.

20. The system as recited in claim 1, further comprising means for enabling a high frequency of scans to be made in the target space to reduce error associated with target data collected relative to the target.

* * * * *